US010104695B2

United States Patent
Yang et al.

(10) Patent No.: US 10,104,695 B2
(45) Date of Patent: Oct. 16, 2018

(54) ULTRA-RELIABLE AND LOW PRIORITY COMMUNICATIONS

(71) Applicant: Verizon Patent and Licensing Inc., Arlington, VA (US)

(72) Inventors: Jin Yang, Orinda, CA (US); Lei Song, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 191 days.

(21) Appl. No.: 15/066,631

(22) Filed: Mar. 10, 2016

(65) Prior Publication Data

US 2017/0265229 A1    Sep. 14, 2017

(51) Int. Cl.
| | |
|---|---|
| *H04W 4/00* | (2018.01) |
| *H04W 74/08* | (2009.01) |
| *H04L 27/00* | (2006.01) |
| *H04L 27/18* | (2006.01) |
| *H04W 4/70* | (2018.01) |

(52) U.S. Cl.
CPC ..... *H04W 74/0833* (2013.01); *H04L 27/0008* (2013.01); *H04L 27/183* (2013.01); *H04W 4/70* (2018.02)

(58) Field of Classification Search
CPC .......... H04W 74/0833; H04W 72/042; H04W 4/005; H04W 72/0446; H04L 27/18
See application file for complete search history.

(56) References Cited

U.S. PATENT DOCUMENTS

| | | | | |
|---|---|---|---|---|
| 2013/0163543 | A1* | 6/2013 | Freda | H04W 72/0406 370/329 |
| 2015/0043455 | A1* | 2/2015 | Miklos | H04W 8/26 370/329 |
| 2015/0117410 | A1* | 4/2015 | Wu | H04W 36/0055 370/331 |
| 2015/0334769 | A1* | 11/2015 | Kim | H04W 76/046 370/329 |
| 2016/0014740 | A1* | 1/2016 | Papasakellariou | H04W 72/042 370/329 |
| 2016/0227560 | A1* | 8/2016 | Webb | H04W 72/1242 |
| 2016/0330633 | A1* | 11/2016 | You | H04L 1/00 |
| 2016/0353440 | A1* | 12/2016 | Lee | H04W 4/005 |

* cited by examiner

*Primary Examiner* — Ayaz Sheikh
*Assistant Examiner* — Hai-Chang Hsiung (57) ABSTRACT

Systems described herein receive, via a physical random access channel, an attach request from a user device; retrieve profile data for the user device; and determine, based on RF conditions estimated from the attach request, an initial downlink repetition level for extended coverage. The systems also receive a reference signal from the user device via a physical uplink shared channel; determine an uplink repetition level for coverage extension based on the uplink RF conditions and requirements from the profile data. The systems detect high resource use within a cell; identify a shared downlink resource channel for the user device, wherein machine-type communication (MTC) data for the user device uses BPSK modulation; identify non-MTC data requiring downlink transmission to a device within the cell; and send the non-MTC data over the shared downlink resource channel, and on a resource pre-allocated for the user device, using a different modulation level.

20 Claims, 9 Drawing Sheets

ULTRA-RELIABLE AND LOW PRIORITY COMMUNICATIONS

BACKGROUND

Internet of Things (IoT) technology refers to a wide range of devices that can collect and forward data. The IoT devices may be configured to transfer the data via a cellular network. Since IoT technology has nearly limitless applications that can be leveraged to form new and useful services, interest among service providers and developers in IoT technology continues to increase. Some project the number of global cellular devices to grow from about 230 million devices in 2014 to more than seven billion devices by 2020. Communications from cellular devices may include low priority signals, while other communications from cellular devices may require ultra-reliable service.

DETAILED DESCRIPTION OF THE PREFERRED EMBODIMENTS

The following detailed description refers to the accompanying drawings. The same reference numbers in different drawings may identify the same or similar elements.

3GPP Long-Term Evolution (LTE) standards, and particularly TR 36.888, Release 13, provide for relaxation of acquisition time requirements and signal repetition to achieve enhanced coverage for low-end devices using machine-type communications (MTC). In the case of signal repetition, a segment of content is repeated identically several times to ensure all signals are received. These standards can be useful for devices using over-the-air resources to transmit and receive low priority network traffic to/from a local base station. In some cases, use of signal repetition enables the system coverage of a cell to be extended at the expense of system capacity.

Some low-end MTC devices (low cost and/or low data rate devices, such as simple data-collection devices) may almost exclusively require enhanced coverage within a cellular network. For example, these MTC devices may be located in a basement or below ground where a high number of repetitive signals are needed to ensure reliable communications with a base station over one or more physical channels. Other MTC devices (such as heart rate monitors and emergency alert devices) may require ultra-reliable communications. Ultra-reliable communications may require additional repetitive signals over a physical data channel to ensure required performance reliability. The low-end MTC devices and the ultra-reliable MTC devices may compete for limited resources with other cellular devices that use mobile broadband services. Repeated signals to ensure extended coverage and ultra-reliable signals may reduce overall capacity of a local radio access network (also referred to herein as a cell).

Systems and methods described herein provide for efficient support of both ultra-reliable wireless communications and extended coverage low priority wireless communications that can be optimized on a per-cell basis. The systems and methods may dynamically determine repetition and resource utilization based on service reliability and radio frequency (RF) conditions within a cell. An ultra-reliable service mode may support mission critical applications, while a low-priority service mode may improve network efficiency and general mobile broadband service. Dynamic decisions may apply network priorities that favor the ultra-reliable service over mobile broadband services and mobile broadband service over the low-priority service.

According to an implementation described herein, a base station may receive, via a physical random access channel, an attach request from a user device (also referred to as "user equipment"); may retrieve profile data for the user device; and may determine, based on RF conditions estimated from the attach request signal, an initial downlink repetition level for extended coverage. The base station may also receive a reference signal from the user device via a physical uplink shared channel and may determine an uplink repetition level for coverage extension based on the uplink RF conditions and reliability requirements from the profile data. The base station may detect congestion within a cell or portion of the cell and may identify a shared downlink resource channel for the user device, where low-priority machine-type communication (MTC) data is using binary phase shift keying (BPSK) modulation. The base station may identify non-MTC data requiring downlink transmission to another device within the cell and may send the non-MTC data over the shared downlink resource channel using a modulation level that is higher than BPSK (e.g., a modulation level that encodes more bits per carrier).

According to another implementation, the user device may receive input signals including the non-MTC data; may detect a modulation level of the input signals as different than BPSK; and may discard the non-MTC data when the modulation level of the input signals is higher than BPSK. Conversely, the user device may receive other input signals including the MTC data; may detect a modulation level of the other input signals as BPSK; and may decode the other input signals when the modulation level of the input signals is BPSK.

Figure 1:
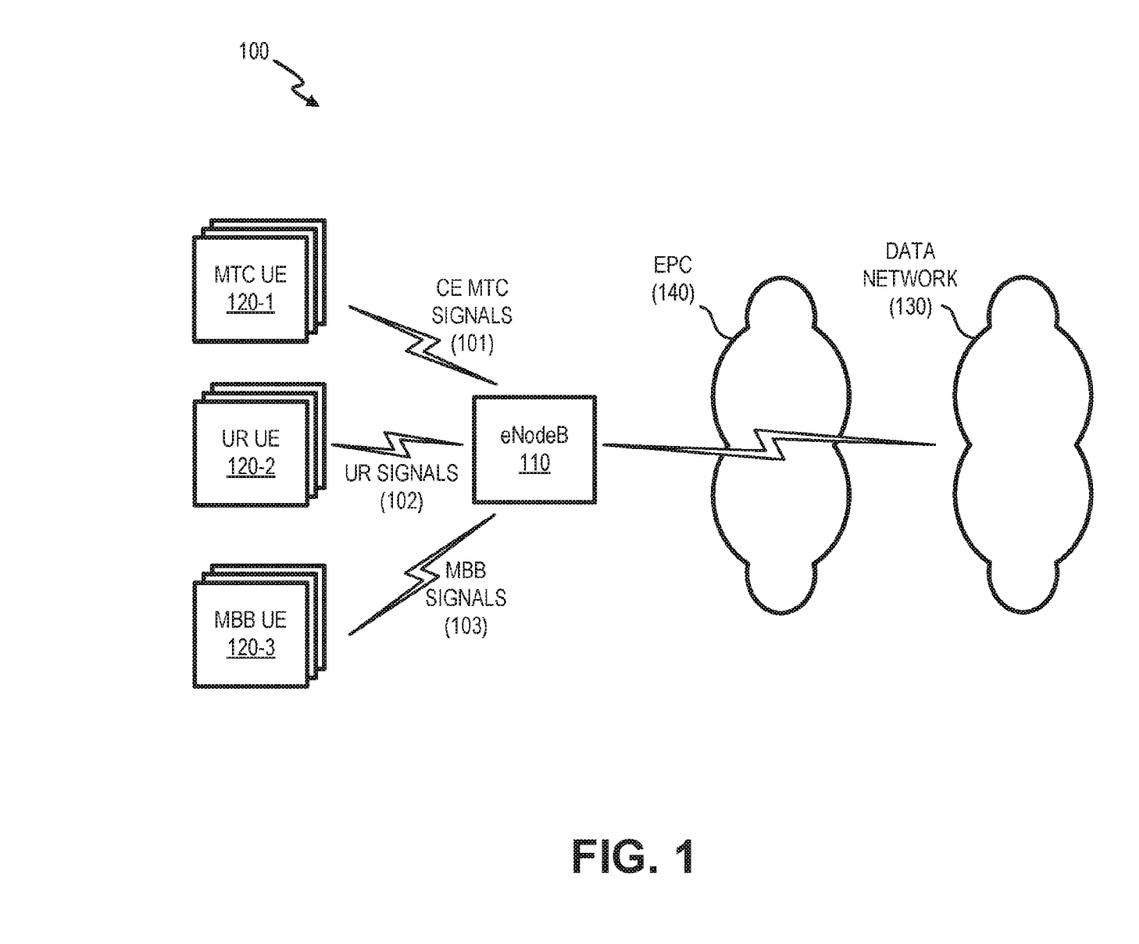
FIG. 1 is a diagram that depicts an exemplary network environment in which systems and methods described herein may be implemented.

FIG. 1 is a diagram that depicts an exemplary network environment 100 in which systems and methods described herein may be implemented. As shown in FIG. 1, network environment 100 may include a base station (enhanced Node B (eNB)) 110 (referred to as "eNB 110"); machine-type communication (MTC) user equipment (UE) 120-1, ultra-reliable (UR) UE 120-2, and mobile broadband (MBB) UE 120-3 (referred to collectively as UEs 120); a data network 130; and an evolved packet core (EPC) 140 connecting UEs 120 to data network 130. Although not shown, network environment 100 may include additional devices, such as a home subscriber server (HSS)/authentication, authorization, and accounting (AAA) server, a policy and charging rules function (PCRF) device, etc., and additional networks. Devices/networks of environment 100 may be interconnected via wired and/or wireless connections.

The eNB 110 may include one or more network devices that operate according to one or more versions of the LTE communication standard. Generally, eNB 110 can simultaneously support communication with multiple UEs 120. Each UE 120 may communicate with eNB 110 via transmissions on forward and reverse wireless links. The forward link (or downlink) refers to the communication link from eNB 110 to UE 120, and the reverse link (or uplink) refers to the communication link from UE 120 to the eNB 110. eNB 110 may receive uplink coverage extension (CE) MTC signals 101 from MTC UE 120-1, ultra-reliable (UR) signals 102 from ultra-reliable UE 120-2, and mobile broadband signals 103 from UE 120-3. eNB 110 may transmit downlink CE MTC signals 101 to MTC UEs 120-1, ultra-reliable (UR) signals 102 to ultra-reliable UEs 120-2, and mobile broadband signals 103 to UEs 120-3. As described further herein, eNB 110 may dynamically determine optimal repetition levels for certain downlink and uplink signals based on service reliability and RF conditions within its cell.

Each UE 120 may generally include a computation and/or communication device, such as a wireless mobile communication device that is capable of communicating with eNB 110 and/or a network (e.g., EPC 140 network). For example, UE 120 may include a cellular telephone; a personal digital assistant (PDA) (e.g., that can include a radiotelephone, a pager, Internet/intranet access, etc.); a smart phone; a laptop computer; a tablet computer; a camera; a personal gaming system, or another type of mobile computation and communication device. In other implementations, UE 120 may include a low-end device with features particularly suited for MTC applications, features such as low cost, long battery life, low data rates, etc. UE 120 may exchange traffic with eNB 110. UE 120 may also, or alternatively, include one or more components such as global positioning system (GPS) components (not shown) that enable a location, associated with UE 120, to be identified.

MTC UE 120-1 may include a device that communicates with another device (e.g., a device connected to data network 130) via machine-to-machine (M2M) communications. Such M2M or machine-type communications typically do not include manual human input. MTC UE 120-1 may include a wide range of applications for monitoring and control purposes in fields such as industrial automation, logistics, Smart Grid, Smart Cities, health, defense, etc. MTC UE 120-1 may operate according to one or more versions of the LTE communication standard. MTC UE 120-1 may rely on low-priority (e.g., best-effort type) traffic to support a particular application, as indicated by CE MTC signals 101. According to an implementation described herein, MTC UE 120-1 may be in a cellular area (e.g., a cell defined by the signal range of eNB 110) that requires coverage extension techniques.

Ultra-reliable UE 120-2 may include a device that communicates with another device (e.g., a device connected to data network 130) via M2M communications or other signals. Ultra-reliable UE 120-2 may include applications for particular uses or particular types of communications that require a high reliability guarantee, such as emergency alerts, critical health monitors, critical system information, etc. MTC UE 120-1 may operate according to one or more versions of the LTE communication standard. Ulta-reliable UE 120-2 may rely on high-priority UR signals 102 to support a particular application.

MBB UE 120-3 may include a device that communicates with another device (e.g., a device connected to data network 130) via mobile broadband signals 103, such as conventional voice/data communications. Communications from MBB UE 120-3, as indicated by MBB signals 103, may be prioritized within network environment 100 with a higher priority than CE MTC signals 101 and lower priority than UR signals 102.

Data network 130 may include one or more wired and/or wireless networks. For example, data network 130 may include the Internet, a public land mobile network (PLMN), and/or another network. Additionally, or alternatively, data network 130 may include a local area network (LAN), a wide area network (WAN), a metropolitan network (MAN), the Public Switched Telephone Network (PSTN), an ad hoc network, a managed Internet protocol (IP) network, a virtual private network (VPN), an intranet, the Internet, a fiber optic-based network, and/or a combination of these or other types of networks.

EPC 140 may include, for example, a mobility management entity (MME), a serving gateway (SGW), a packet data network (PDN) gateway (PGW), and a home subscriber server (HSS). For example, the MME may perform idle mode tracking and paging procedures (e.g., including retransmissions) for UE 120, and the SGW may exchange data packets with UE 120. The PGW may include one or more data transfer devices (or network devices), such as a gateway, a router, a switch, a firewall, a network interface controller (NIC), a hub, a bridge, a proxy server, an optical add/drop multiplexer OADM, or some other type of device that exchanges data between eNB 110 and data network 130. The HSS may manage, update, and/or store, in a memory associated with the HSS 132, service profile information associated with UEs 120. The service profile information may identify services (e.g., names of services, access point names (APNs), packet data networks, etc.) that are subscribed to and/or accessible by a UE 120.

The quantity of devices and/or networks, illustrated in FIG. 1, is provided for explanatory purposes only. In practice, there may be additional devices and/or networks, fewer devices and/or networks, different devices and/or networks, or differently arranged devices and/or networks than those illustrated in FIG. 1. Also, in some implementations, one or more of the devices of network environment 100 may perform one or more functions described as being performed by another one or more of the devices of network environment 100.

Figure 2:
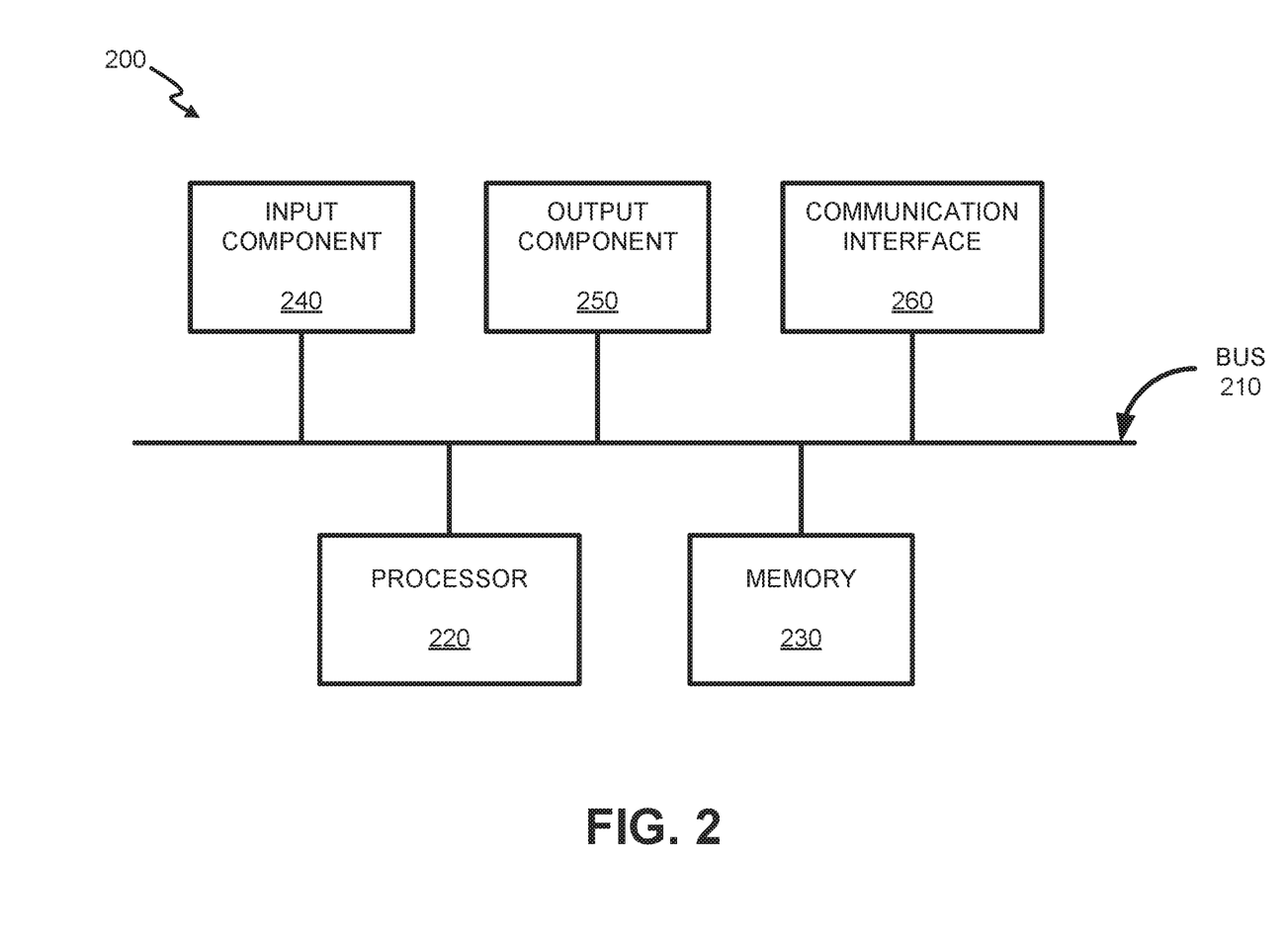
FIG. 2 shows a diagram of exemplary components that may be included in a computing device included in the network environment shown in FIG. 1.

FIG. 2 is a diagram illustrating exemplary components of a device 200. Device 200 may correspond, for example, to a component of eNB 110, UE 120, a component of data network 130, or a component of EPC 140. Alternatively or additionally, eNB 110, UE 120, a component of data network 130, or a component of EPC 140 may include one or more devices 200 and/or one or more components of device 200.

Device 200 may include a bus 210, a processor 220, a memory 230, an input component 240, an output component 250, and a communication interface 260. Although FIG. 2 shows exemplary components of device 200, in other implementations, device 200 may contain fewer components, additional components, different components, or differently arranged components than those depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220. Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of RF signals. For example, communication interface 260 may include one or more antennas to transmit and/or receive RF signals over the air. Communication interface 260 may, for example, receive RF signals and transmit them over the air to eNB 110/UE 120, and receive RF signals over the air from eNB 110/UE 120. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hard-wired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. In these situations, device 200 may be a "headless" device that does not include input component 240. Additionally, or alternatively, one or more operations described as being performed by a particular component of device 200 may be performed by one or more other components, in addition to or instead of the particular component of device 200.

Figure 3:
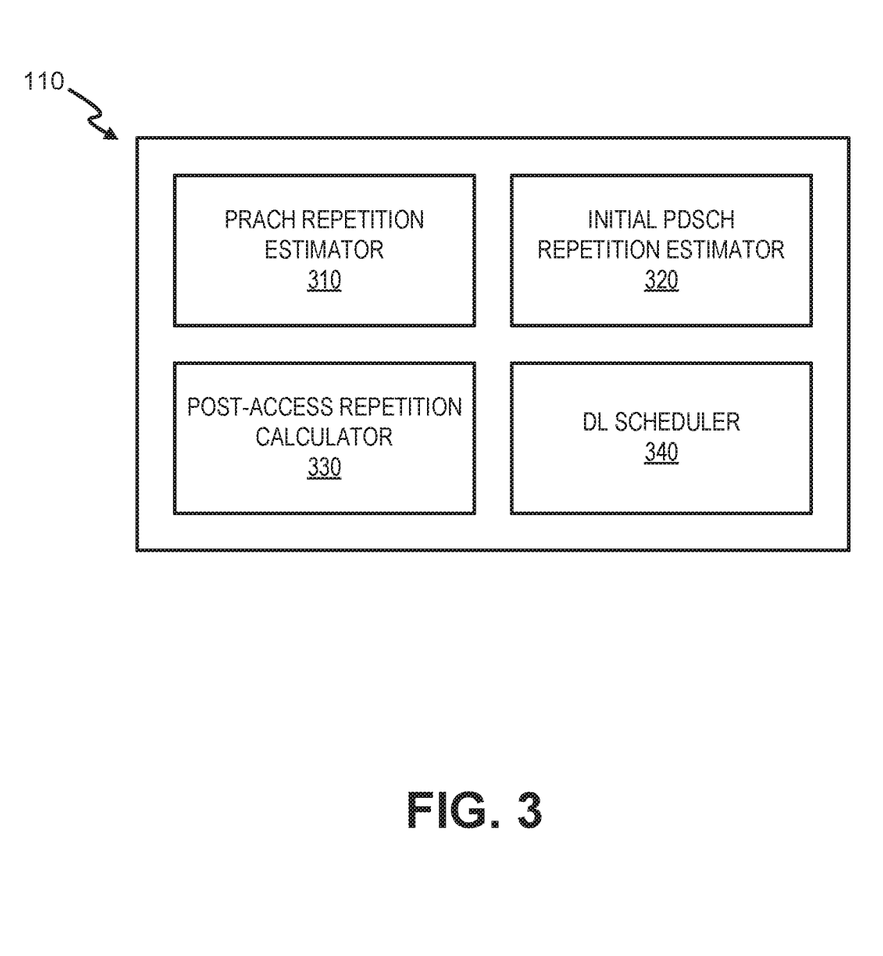
FIG. 3 is a diagram of exemplary functional components of a base station of FIG. 1.

FIG. 3 is a diagram of exemplary components of eNB 110 of FIG. 1, which may be implemented using one or more components of device 200 (FIG. 2). As shown in FIG. 3, eNB 110 may include a physical random access channel (PRACH) repetition estimator 310, an initial physical downlink shared channel (PDSCH) estimator 320, a post-access repetition calculator 330, and a downlink (DL) scheduler 340.

PRACH repetition estimator 310 may determine an initial repetition for PRACH transmissions for a particular UE 120. Generally, to achieve coverage extension for initial random access, eNB 110 specifies thresholds for each UE 120 to decide whether or not to apply repetition to the PRACH signals and which repetition level to use based on, for example, a reference signal receive power (RSRP) measurement. UE 120 may apply these thresholds to select a particular repetition level needed for coverage extension at a measured RF signal strength. Different PRACH configuration indices and/or different frequency offsets are used to support different repetition levels, which are selected by UE 120 for initial communications over the PRACH. PRACH repetition estimator 310 estimates RF conditions for a particular UE 120 based on the resource set used by UE 120 and its implied repetition level. More particularly, PRACH repetition estimator 310 may detect frequency offsets and other characteristics of an access request from UE 120 and work backwards from the same thresholds originally broadcast to UE 120 to determine the signal repetition level of the access request. Thus, the repetition level used by UE 120 can be determined by eNB 110 without an express indication from UE 120.

Initial PDSCH repetition estimator 320 translates the implied repetition level into an initial data repetition setting of the PDSCH for the particular UE 120. When determining a repetition level of other channels based on the PRACH, initial PDSCH repetition estimator 320 considers the maximum coverage loss (MCL) gap and the UE category/type. In one implementation, initial PDSCH repetition estimator 320 may use an initial repetition level lookup table that allows initial PDSCH repetition estimator 320 to cross-reference the implied PRACH repetition level from UE 120 to a corresponding PDSCH repetition level. For example, initial PDSCH repetition estimator 320 may apply the following initial repetition level lookup table (e.g., Table 1) for a category of a low-cost UE 120 (e.g., 20 decibel-milliwatts (dBm), 1 Rx):

TABLE 1

|  |  | CE level 1<br>(0-5 dB) | CE level 2<br>(5-10 dB) | CE level 3<br>(10-15 dB) |
|---|---|---|---|---|
| Normal<br>complexity UEs | PRACH<br>PDSCH | 0-4<br>0-0.3 | 4-9<br>0.3-5.3 | 9-14<br>5.3-10.3 |
|  |  | CE level 1<br>(0-6 dB) | CE level 2<br>(6-12 dB) | CE level 3<br>(12-18 dB) |
| Rel-13 low<br>complexity UEs | PRACH<br>PDSCH | 0-5<br>0-2.3 | 5-11<br>2.3-8.3 | 11-17<br>8.3-14.3 |

Different variations of Table 1 may be used for different categories of UE 120. Using an appropriate table corresponding to a particular UE 120, initial PDSCH repetition estimator 320 may determine to achieve the same coverage extension level (e.g., CE level 1, CE level 2, or CE level 3) for the PDSCH as for the PRACH or one repetition level above or below based on the table. For example, if a low complexity UE coverage extension level 2 PRACH is detected, it means a 5-11 dB extension is needed for the PRACH while only a 2.3-8.3 dB extension is needed for the PDSCH. eNB 110 may choose a specific PDSCH coverage extension target, for example 7 dB, based on cell specific RF factors, such as loading and interference level and eNB 110 may use another look up table to map the target coverage extension to a specific number of repetitions, (e.g., 64 times) for the initial PDSCH transmission.

Post-access repetition calculator 330 may calculate uplink and downlink repetition levels, after initial access by UE 120, based on RF conditions and reliability requirements. Post-access repetition calculator 330 may estimate a physical uplink share channel (PUSCH) demodulation reference signal (DMRS) power level from UE 120 and use the DMRS power level to estimate the path loss. More particularly, the minimum coupling loss will equal the UE transmit (tx) power minus the received (rx) DMRS power level. In CE mode with repetition, it is known that UE 120 will transmit signals with maximum power, and post-access repetition calculator 330 can determine the maximum power for a particular UE 120 from the power class assigned to the UE 120. The power class (e.g., 20 dBm or 23 dBm) may be stored as part of a UE profile with a component of EPC 140 or signaled by UE 120 during the access process. The received DMRS power level is estimated from the DMRS waveform components (e.g., power=$I^2+Q^2$, where I and Q are the in-phase and quadrature components of the waveform). Post-access repetition calculator 330 may calculate the UL minimum coupling loss and use a lookup table, such as Table 2 below, to decide an UL repetition level for the PUSCH.

TABLE 2

| Min. Coupling Loss | UL CE Target | PUSCH Repetition Level |
| --- | --- | --- |
| 140.7-145.7 dB | 0-5 dB | 1 |
| 145.7-150.7 dB | 5-10 dB | 2 |
| >150.7 | 10-15 dB | 3 |

Post-access repetition calculator 330 may then determine the minimum coupling loss for the DL by taking into account other UE 120 receiver characteristics (as indicated in the UE profile, such as a 1 Rx or 2 Rx antenna), and then determines the repetition level using a mapping table, such as Table 3, which takes into account DL-UL link differences for a particular UE type.

TABLE 3

| Min. Coupling Loss | DL CE Target | PDSCH Repetition Level |
| --- | --- | --- |
| 145.3-150.3 dB | 0-5 dB | 1 |
| 150.3-155.3 dB | 5-10 dB | 2 |
| >155.3 | 10-15 dB | 3 |

Thus, eNB 110 may dynamically estimate optimal repetition levels for the PDSCH at initial access and, after initial access by UE 120, may dynamically calculate PUSCH and PDSCH repetition levels for the particular UE 120.

DL scheduler 340 may schedule use of resources (e.g., information blocks delivered over a physical layer) to optimize delivery of ultra-reliable and best effort traffic to UEs 120 within a cell of eNB 110. In one implementation, DL scheduler 340 may determine a final repetition level and provide extra repetitions for data designated with ultra-reliable service. For example, DL scheduler 340 may increase the repetition and CE level for ultra-reliable service, such as providing an extra five repetitions or a higher dB margin for ultra-reliable traffic (e.g., downlink UR signals 102). The enhanced ultra-reliable service may be provided at the expense of lower priority MBB data (e.g., downlink MBB signals 103). DL scheduler 340 may, for example, block (or puncture) MBB data for MBB UE 120-3 on a particular channel and instead assign those portions of the channel resource to UR UE 120-2. MBB data may be assigned every sub-frame with downlink control information (DCI) over a Physical Downlink Control Channel (PDCCH). Therefore, DL scheduler 340 can achieve puncturing of the MBB data by not sending the DCI to MBB UE 120-3, so that the MBB UE 120-3 will not receive at (or accumulate) the particular sub-frames that DL scheduler 340 allocates to UR UE 120-2.

DL scheduler 340 may also selectively re-allocate resources for low priority traffic for MTC UE 120-1 to higher priority MBB traffic for MBB UE 120-3. In best effort mode, traffic for MTC UE 120-1 has low priority. DL scheduler 340 may schedule repetition of MTC UE 120-1 prior to a first transmission. For example, default repetition counts may be as high as 2048 times for a particular UE 120. However, eNB 110 is not restricted to always honor the resource assignment for best effort traffic. During high load conditions within the cell of eNB 110, DL scheduler 340 may use some of the downlink resource pre-allocated to MTC UE 120-1 to instead provide higher priority MBB data to MBB UE 120-3. According to implementations described herein, DL scheduler 340 may use different phase modulation techniques to differentiate signals for different devices over the same resource (e.g., a PDSCH). eNB 110 may only uses the lowest level of modulation—binary phase shift keying (BPSK)—for the downlink transmission to MTC UE 120-1 and uses a higher order of modulation—quadrature phase shift keying (QPSK) or higher—for the downlink transmission to MBB UE 120-3 on the resources pre-allocated to MTC signals (e.g., for MTC UE 120-1).

As described further herein, MTC UE 120-1 may detect the modulation used in the downlink transmission to identify if a particular subframe contains information intended for MTC UE 120-1 (and therefore requiring the MTC UE 120-1 accumulate the data) or if the particular subframe is borrowed by eNB 110 to transfer information intended for other MBB users. This modulation identification of each subframe, therefore, allows proper accumulation of signals on the UE side when some of the pre-allocated CE MTC downlink resources are borrowed for higher priority communications.

Although FIG. 3 shows exemplary components of eNB 110, in other implementations, eNB 110 may include fewer components, different components, or additional components than those depicted in FIG. 3. For example, eNB 110 may include a device profile component to cache UE configurations. Alternatively, or additionally, one or more components of eNB 110 may be performed by one or more other devices, such as devices in EPC 140.

Figure 4:
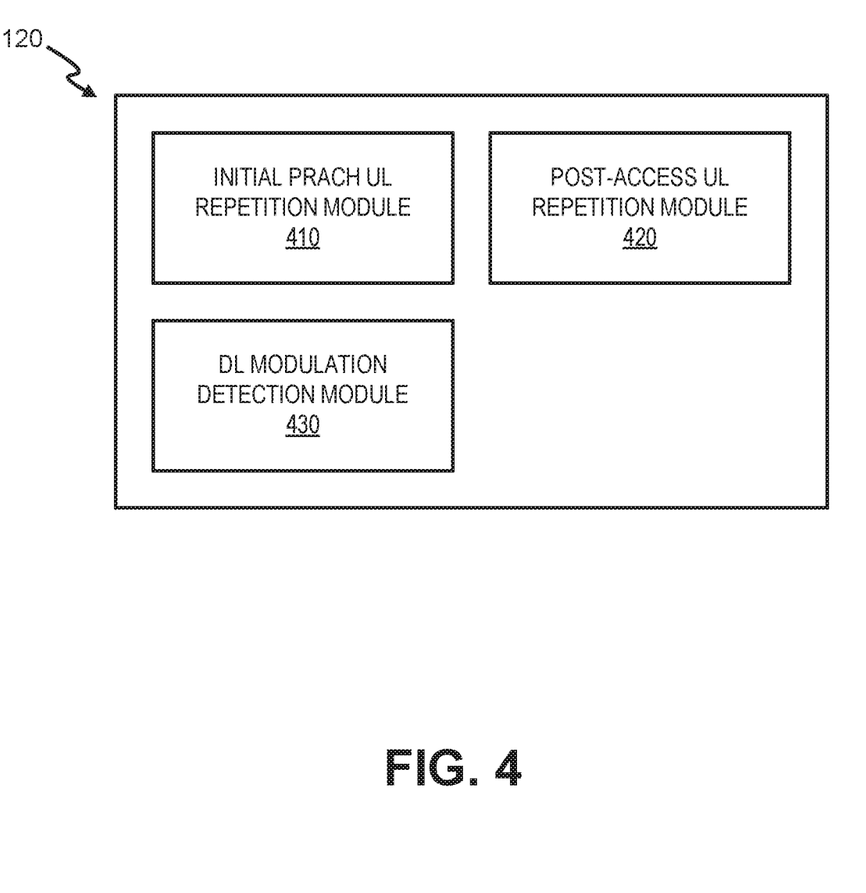
FIG. 4 is a diagram of exemplary functional components of user equipment (UE) of FIG. 1.

FIG. 4 is a diagram of exemplary components of UE 120, which may be implemented using one or more components of device 200 (FIG. 2). As shown in FIG. 4, UE 120 may include an initial PRACH UL repetition module 410, a post-access UL repetition module 420, and a DL modulation detection module 430.

Initial PRACH UL repetition module 410 may apply coverage extension thresholds specified by eNB 110 (as provided, for example, via a physical broadcast channel (PBCH)) to determine whether or not to apply repetition to signals sent via the PRACH and which repetition level to use based on (for example) an RSRP measurement. Repetition levels determined by initial PRACH UL repetition module 410 may be used by UE 120 for sending initial access signals to eNB 110.

Post-access UL repetition module 420 may apply coverage extension (or repetition) levels specified by eNB 110 after initial access by UE 120. For example, post-access UL repetition module 420 may implement repetition levels determined by post-access repetition calculator 330 and provided, for example, via a PDCCH or an enhanced PDCCH.

DL modulation detection module 430 may detect and filter downlink transmission signals for proper accumulation by UE 120. MTC UE 120-1 may detect the modulation used in the downlink transmission to identify if a particular subframe contains information intended for the UE (and therefore requiring accumulation) or if the particular subframe has been borrowed by eNB 110 to transfer information (e.g., for MBB data) intended for another UE 120. According to an implementation described herein, DL modulation detection module 430 may differentiate between BPSK and QPSK (or higher order) modulations in signals with a very low Signal to Interference-plus-Noise Ratio (SINR) by accumulating descrambled, channel-compensated I and Q waveform data after a Fast Fourier Transform (FFT) is applied. Thus, modulation schemes may be differentiated based on pattern recognition, without decoding.

Although FIG. 4 shows exemplary components of UE 120, in other implementations, UE 120 may include fewer components, different components, or additional components than those depicted in FIG. 4. For example, UE 120 may include other signal processing and communication components.

Figure 5:
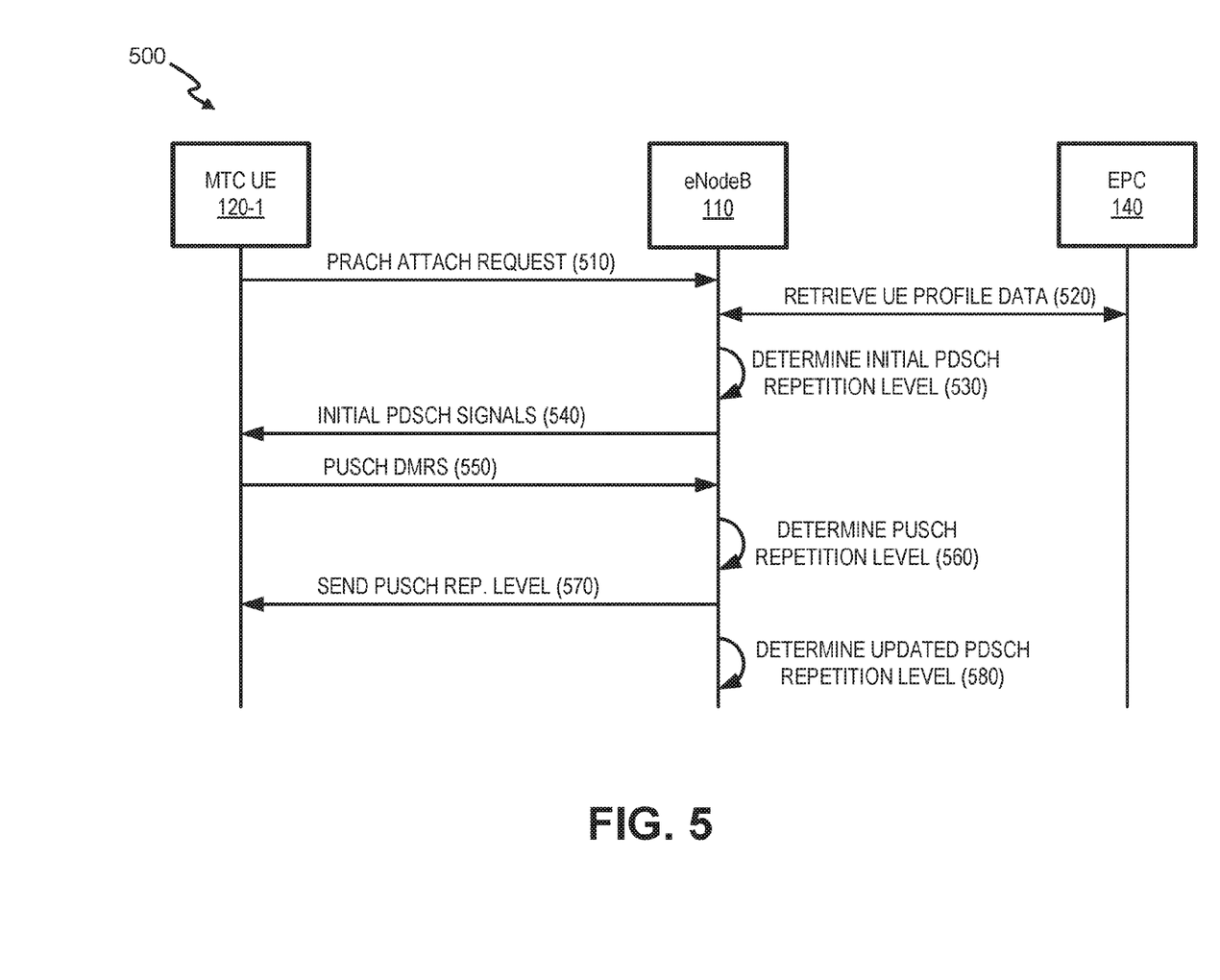
FIG. 5 is a diagram showing communications in a portion of the network environment of FIG. 1.

FIG. 5 is a diagram showing communications in a portion 500 of the network environment 100. Network portion 500 represents communications for assigning optimal repetition levels for MTC UE 120-1 when coverage extension is required. Network portion 500 may include eNB 110, MTC UE 120-1, and EPC 140.

As shown in FIG. 5, MTC UE 120-1 may provide an initial attachment request 510 to eNB 110. Initial attachment request 510 may be provided over the PRACH using a repetition level (determine, e.g., by initial PRACH UL repetition module 410) based on previously broadcast thresholds and RSRP measurements.

In response to initial attachment request 510, eNB 110 may retrieve 520 UE profile data from EPC 140. The UE profile data may identify UE features (e.g., power level, antenna types, etc.) for MTC UE 120-1. Based on the resource set used by MTC UE 120-1 in attach request 510 and its implied repetition level, eNB 110 (e.g., PRACH repetition estimator 310) may estimate an RF condition for MTC UE 120-1. Initial PDSCH repetition estimator 320 may use the estimated RF condition to determine 530 an initial PDSCH repetition level. Using the initial PDSCH repetition level determined by initial PDSCH repetition estimator 320, eNB 110 may provide initial PDSCH signals 540 to MTC UE 120-1.

After initial access by MTC UE 120-1, eNB 110 may receive signals from MTC UE 120-1 via a PUSCH that include a PUSCH DMRS 550. eNB 110 (e.g., post-access repetition calculator 330 may estimate the uplink DMRS signal power level to estimate the path loss over the PUSCH. Post-access repetition calculator 330 may then calculate the uplink minimum coupling loss and use a lookup table (e.g., Table 2) to decide an uplink repetition level for the PUSCH. In one implementation, the uplink repetition level may be provided to MTC UE 120-1 (via a PDCCH or an enhanced PDCCH) for implementation by UE 120-1 (e.g., post-access UL repetition module 420), as indicated by reference 570.

Post-access repetition calculator 330 may estimate a downlink minimum coupling loss, based on the uplink minimum coupling loss calculated above, by taking into account MTC UE 120-1 receiving characteristics (e.g., 1 Rx or 2 Rx antenna). Using the estimated downlink minimum coupling loss, post-access repetition calculator 330 may then determine an updated PDSCH repetition level 580 using a mapping table (e.g., Table 3 above) which takes into account the downlink/uplink link budget difference. Thus, eNB 110 dynamically determines repetition levels and resource utilization based on service reliability and RF condition for a particular UE 120.

eNB 110 may continue to provide signals to MTC UE 120-1 using the updated PDSCH repetition level 580, or eNB 110 may dynamically calculate a new PDSCH repetition level based on changes in the PUSCH DMRS. According to implementations described herein, in the event of detected congestion, eNB 110 may preempt use of resources previously allocated to MTC UE 120-1 for repetition (e.g., as calculated for updated PDSCH repetition level 580) to deliver higher priority MBB data. To enable repurposing of the pre-allocated resources eNB 110 may provide different (e.g., high) modulation levels for the MBB data and, as described further in FIG. 6, MTC UE 120-1 may be equipped to differentiate between the default modulation of CE MTC signals (e.g., BPSK) and the higher level modulation used for the MBB data (QPSK).

Figure 6:
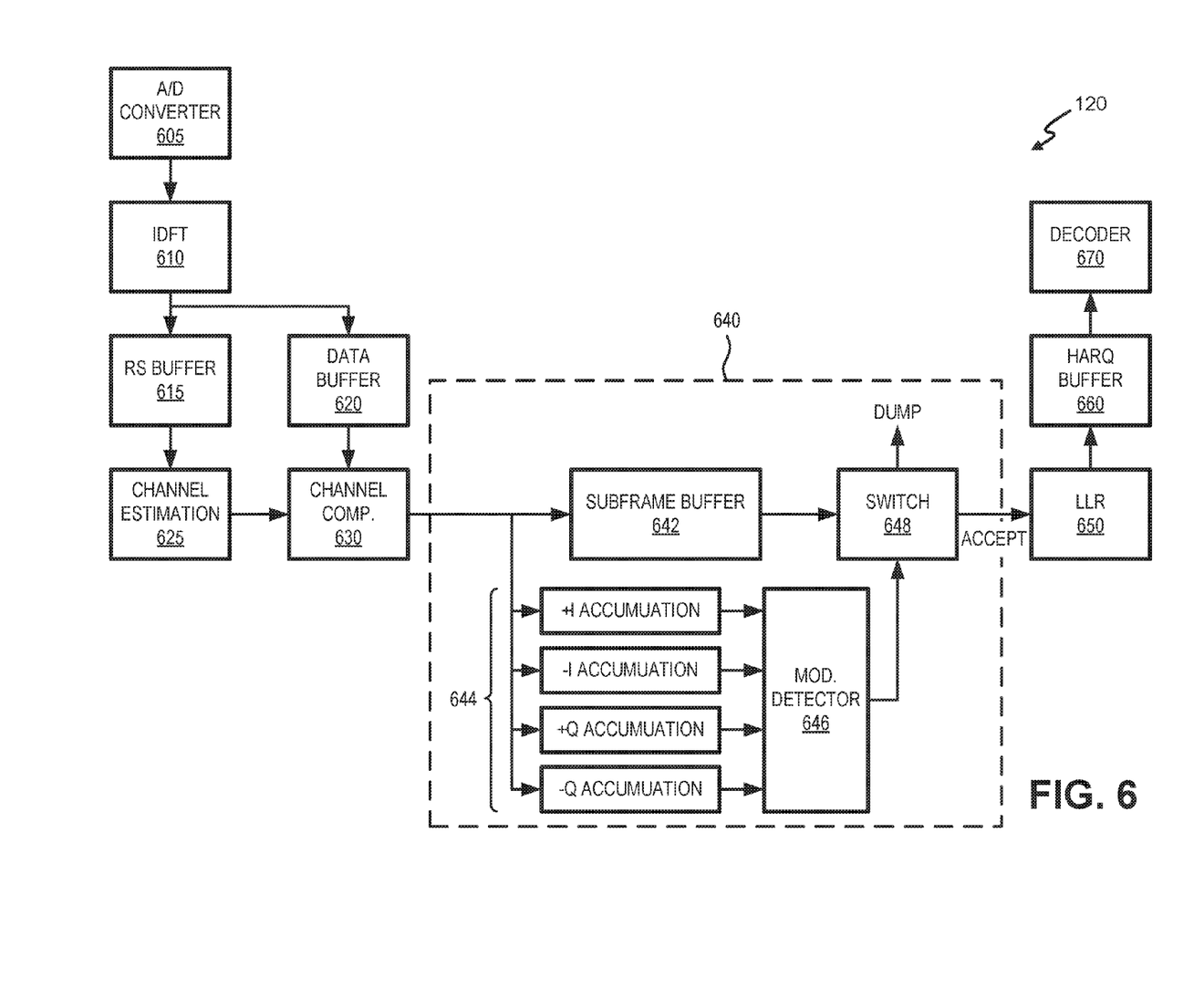
FIG. 6 is a diagram showing exemplary components of a UE for implementing a downlink modulation detection module of FIG. 4.

FIG. 6 is a diagram showing exemplary components of UE 120 for implementing downlink modulation detection module 430. As shown in FIG. 6, UE 120 may include an analog-to-digital (A/D) converter 605, an inverse discrete Fourier transform (IDFT) module 610, a reference signal (RS) buffer 615, a data buffer 620, a channel estimation module 625, a channel compensation module 630, a hypothesis accumulator 640, a log-likelihood ratio (LLR) module 650, a hybrid automatic repeat request (HARQ) buffer 660, and a decoder 670.

A/D converter 605, IDFT module 610, RS buffer 615, data buffer 620, channel estimation module 625, channel compensation module 630, LLR module 650, HARQ buffer 660, and decoder 670 may generally perform conventional functions for a UE implementing LTE standards. Particularly, these components of UE 120 may receive signals from eNB 110, convert the signals into digital form, and compensate for phase shifts and amplitude distortion to provide descrambled, channel-compensated signals.

Hypothesis accumulator 640 collects bits from a complete subframe and performs a binary selection of the modulation level for the subframe. More particularly, hypothesis accumulator 640 determines if each complete subframe uses one of BPSK modulation or a higher level of modulation (QPSK or higher). Subframes identified with BPSK modulation may be accumulated by MTC UE 120-1, while subframes identified with QPSK (or higher) modulation can be discarded (e.g., as including data intended for another UE 120). Hypothesis accumulator 640 may include a subframe buffer 642, waveform component accumulations 644, modulation detector 646, and a switch 648.

Subframe buffer 642 may receive input bits from channel compensation module 630 and temporarily store the bits until a complete subframe is accumulated and an accumulation decision (e.g., accept/reject) is made for the particular subframe. Thus, input into subframe buffer 642 may include a low-quality signal with proper channel compensation.

Waveform component accumulations 644 may log descrambled, channel-compensated I and Q waveform data as one of +I, −I, +Q, or −Q for each bit of a particular subframe (e.g. a subframe stored in subframe buffer 642).

Modulation detector 646 may apply pattern recognition to waveform component accumulations 644 to determine if the collection of waveform component accumulations 644 over the particular subframe indicates BPSK modulation or a higher level (e.g., QPSK) modulation. For example, if the energy in one of the phases in waveform component accumulations 644 is significantly higher than the energy in the other phase, modulation detector 646 may predict that the particular subframe in subframe buffer 642 was modulated via BPSK modulation. Conversely, if the energy level difference in waveform component accumulations 644 is small, modulation detector 646 may predict that the particular subframe in subframe buffer 642 was modulated via a higher level of modulation than BPSK (e.g., a modulation scheme that has a higher data rate or encodes more bits per symbol on a carrier, such as QPSK or higher, in both in-phase and quadrature). In one implementation, when the descrambled, channel-compensated I and Q waveform data has been processed for the entire subframe, modulation detector 646 may forward the detected modulation for the particular subframe to switch 648. In other implementations, different pattern identification techniques may be used, for example, by using the phases differences between the signals received in different time/frequency location. In still other implementations, fewer bits may be used to detect the modulation, instead of an entire subframe. For example, significantly higher energy in one of waveform component accumulations 644 may enable detection of BPSK modulation before all bits of a subframe are processed.

Switch 648 may receive the modulation indication from modulation detector 646 and accept or discard the subframe from subframe buffer 642 based on the modulation indication (e.g., as BPSK or higher than BPSK) from modulation detector 646. Discarded subframes will not be decoded or processed further by UE 120-1. Accepted subframes can be passed to LLR 650 module for further processing, buffering, and eventual decoding by decoder 670.

Using hypothesis accumulator 640, MTC UE 120-1 may perform a binary analysis of signal modulation without decoding symbol data associated with particular frequency bands. Thus, hypothesis accumulator 640 may provide a reliable decision to distinguish between signals intended for MTC UE 120-1 and other signals sharing the same resource even when the signals have a very low SINR.

Although FIG. 6 shows exemplary components of UE 120 for implementing downlink modulation detection module, in other implementations, UE 120 may include fewer components, different components, or additional components than those depicted in FIG. 6.

Figure 7:
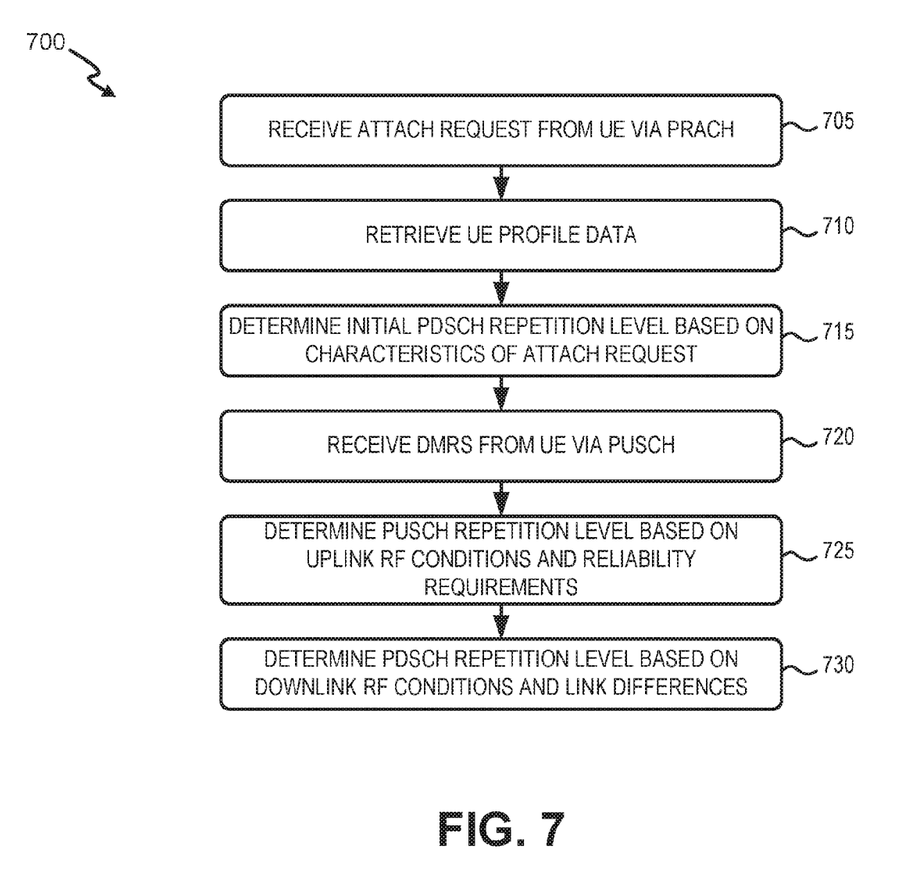
FIGS. 7 and 8 are flow diagrams that illustrates an exemplary process for processing ultra-reliable and low priority communications by a base station, according to an implementation described herein.
Figure 8:
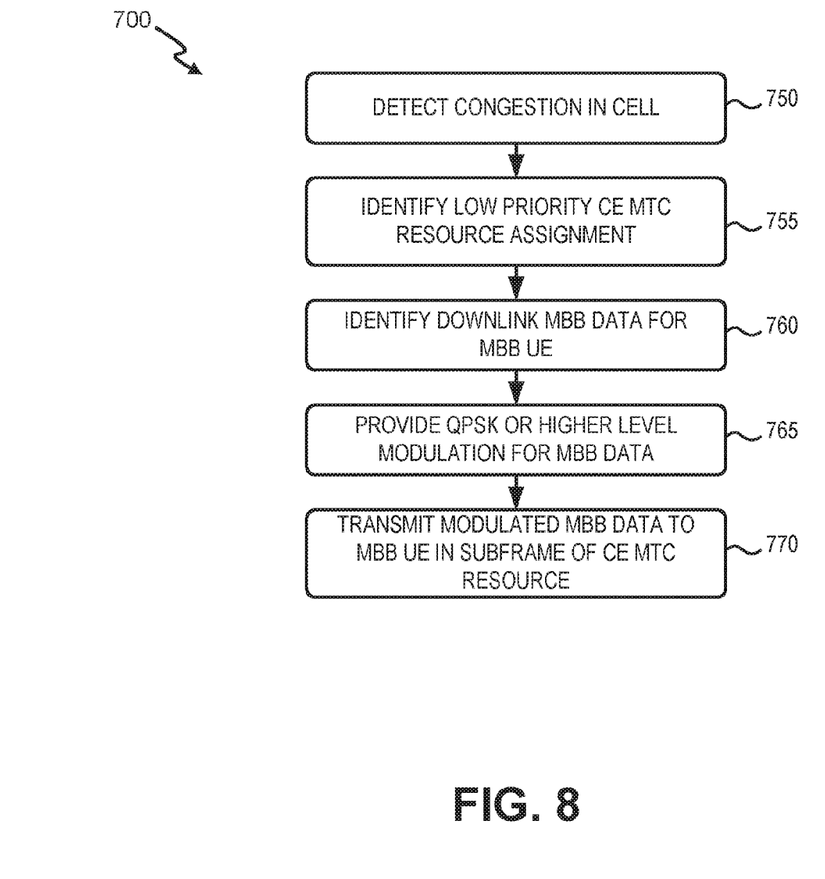

FIGS. 7 and 8 are flow diagrams illustrating an exemplary process 700 for processing ultra-reliable and low priority communications by a base station. In one implementation, process 700 may be implemented by eNB 110. In another implementation, process 700 may be implemented by eNB 110 in conjunction with one or more other devices in network environment 100, such as one or more devices in EPC 140.

Process 700 may include receiving an attach request from a UE via a PRACH (block 705) and retrieving UE profile data (block 710). For example, eNB 110 may receive an attach request from UE 120-1 via a PRACH. The attach request may include a particular frequency and number of repetitions that are indicative of a coverage extension (CE) level (e.g., a coverage extension level defined in the LTE rel. 13 specification). In response to receiving the request, eNB 110 may retrieve profile data for UE 120-1 from EPC 140. The profile data may include, for example, a power class (e.g., 20 dBm or 23 dBm), an antenna structure (e.g., a 1 Rx or 2 Rx antenna), and/or a device category (e.g., low-priority MTC, ultra-reliable, etc.) for UE 120-1.

Process 700 may also include determining an initial PDSCH repetition level for coverage extension based on characteristics of attach request (block 715). For example, eNB 110 (e.g., PRACH repetition estimator 310) may estimate RF conditions for MTC UE 120-1 based on the resource set used by MTC UE 120-1 and its implied repetition level. Initial PDSCH repetition estimator 320 of eNB 110 may translate the implied repetition level into an initial data repetition setting of the PDSCH for MTC UE 120-1.

Process 700 may further include receiving a DMRS from the UE via a PUSCH (block 720), and determining a PUSCH repetition level based on the uplink RF conditions and reliability requirements (block 725). For example, after attachment, eNB 110 may receive a DMRS from MTC UE 120-1 via a PUSCH. eNB 110 (e.g., post-access repetition calculator 330) may estimate the path loss, such as by subtracting the received (rx) power level of the DMRS from the UE transmit (tx) power (based on the power class of MTC UE 120-1 obtained from the profile data). eNB 110 may use a lookup table, like Table 2 above, that cross-references the minimum coupling loss with needed repetition levels to determine a UL repetition level for the PUSCH.

Process 700 may additionally include determining a PDSCH repetition level based on the downlink RF conditions and differences in link properties (block 730). For example, eNB 100 (e.g., post-access repetition calculator 330) may decide the minimum coupling loss for the DL by taking into account other MTC UE 120-1 receiver characteristics (as indicated in the UE profile, such as antenna characteristics), and then decide the repetition level using a mapping table, such as Table 3 above, which takes into account DL-UL link differences for a particular UE type.

Referring to FIG. 8, process 700 may further include detecting congestion in a cell (block 750) and identifying a low-priority CE MTC resource assignment (block 755). For example, eNB 110 may store a threshold congestion level pertaining to physical resources for its associated wireless network (or cell). eNB 110 may detect the congestion level is reached (e.g., during a peak-use period) and determine that low-priority MTC downlink transmission should be temporarily preempted to support delivery of MBB data. Particularly, eNB 110 may preempt use of resources reserved to support multiple repetitions for downlink coverage extension for MTC UE 120-1.

Process 700 may also include identifying downlink MBB data for an MBB UE (block 760), providing QPSK or higher level modulation for the MBB data (block 765), and transmitting the modulated MBB data to the MBB UE in a subframe of the CE MTC resource (block 770). For example, during high load conditions, eNB 110 (e.g., DL scheduler 340) may identify high levels of queued MBB traffic (e.g., directed to MBB UE 120-3). eNB 110 may use some of the downlink resource pre-allocated to MTC UE 120-1 for multiple repetitions, to instead provide the higher priority MBB data to another UE 120 (e.g., MBB UE 120-3). Particularly, eNB 110 may identify a PDSCH for MTC UE 120-1, where BPSK modulation is used to best support extended coverage. eNB 110 may use a different modulation (e.g., QPSK or higher levels) for the MBB traffic and send the MBB traffic over the PDSCH using QPSK (or a higher level) modulation in information blocks originally reserved for MTC UE 120-1.

Figure 9:
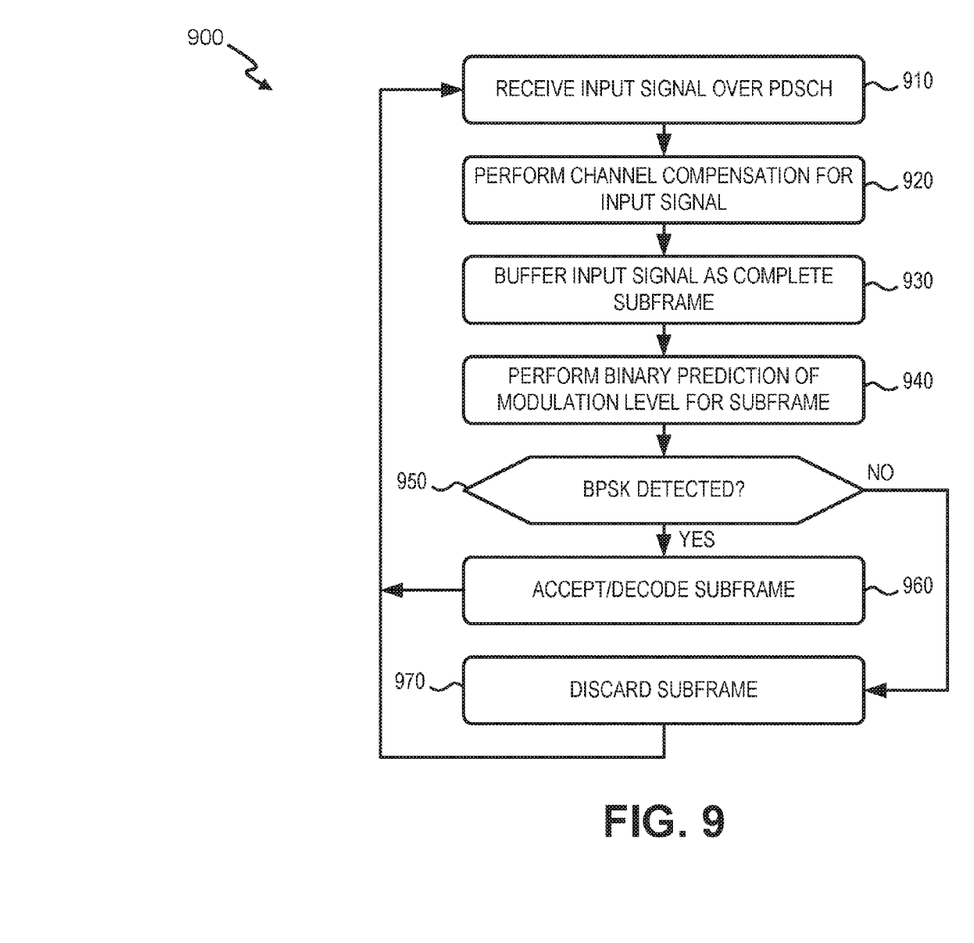
FIG. 9 is a flow diagram that illustrates an exemplary process for processing low priority communications by a UE, according to an implementation described herein.

Process 900 is a flow diagram that illustrates an exemplary process for processing low priority communications by a UE. In one implementation, process 900 may be implemented by MTC UE 120-1. In another implementation, process 900 may be implemented by another UE 120 or MTC UE 120-1 in conjunction with one or more other devices in network environment 100, such as eNB 110.

Process 900 may include receiving input signals over a PDSCH (block 910), and performing channel compensation for the input signals (block 920). For example, MTC UE 120-1 may receive input signals from eNB 110 via a PDSCH. The signals may be processed through A/D converter 605, IDFT module 610, RS buffer 615, data buffer 620, channel estimation module 625, and channel compensation module 630 to provide descrambled, channel-compensated bits to hypothesis accumulator 640.

Process 900 may also include buffering the input signals as a complete subframe (block 930), performing a binary prediction of a modulation level for the subframe (block 940), and determining whether BPSK modulation is used in the subframe (block 950). For example, hypothesis accumulator 640 of MTC UE 120-1 may collect bits in subframe buffer 642 while logging descrambled, channel-compensated I and Q waveform data as one of +I, −I, +Q, or −Q in waveform component accumulations 644 for each bit of a particular subframe. Modulation detector 646 of MTC UE 120-1 may apply pattern recognition to waveform component accumulations 644 to determine if the collection of waveform component accumulations 644 over the particular subframe indicates that BPSK modulation or a higher level (e.g., QPSK) modulation was used.

If the modulation level for the subframe indicates BPSK (block 950—Yes), process 900 may include accepting and decoding the subframe (block 960). For example, switch 648 of MTC UE 120-1 may receive a modulation indication from modulation detector 646 and accept the subframe from subframe buffer 642 based on a modulation indication of BPSK from modulation detector 646. Accepted subframes can be passed to LLR 650 module for further processing, buffering, and eventual decoding by decoder 670.

If the modulation level for the subframe does not indicate BPSK was used (block 950—No), process 900 may include discarding the subframe (block 970). For example, switch 648 MTC UE 120-1 may receive a modulation indication from modulation detector 646 and discard the subframe from subframe buffer 642 based on the modulation indication as higher than BPSK (e.g., QPSK or higher) from modulation detector 646. Discarded subframes will not be decoded or processed further by MTC UE 120-1.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 7-9, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a base station and via a physical random access channel, an attach request from a user device;
   retrieving, by the base station and from a core network, profile data for the user device, wherein the profile data includes an indication that the user device transmits low priority machine-type communication (MTC) data;
   determining, by the base station and based on radio frequency (RF) conditions estimated from the attach request, an initial downlink repetition level for extending coverage to the user device;
   receiving, by the base station and after receiving the attach request, a reference signal from the user device via a physical uplink shared channel;
   determining, by the base station, an uplink repetition level for coverage extension based on uplink RF conditions and reliability requirements from the profile data;
   detecting, by the base station, a congestion level with a cell or portion of the cell;
   identifying, by the base station, a shared downlink resource channel for the user device, wherein MTC data for the user device uses binary phase shift keying (BPSK) modulation over the shared downlink resource channel;
   identifying, by the base station, non-MTC data requiring downlink transmission to another device within the cell; and sending, by the base station, the non-MTC data to the other device over the shared downlink resource channel, and on a subframe pre-allocated for the user device, using a modulation level other than BPSK, wherein the modulation level other than BPSK indicates that the non-MTC data is to be discarded by the user device.

2. The method of claim 1, wherein sending the non-MTC data over the shared downlink resource channel using a modulation level other than BPSK includes sending the non-MTC data using quadrature phase shift keying (QPSK) or a higher level modulation.

3. The method of claim 2, wherein sending the non-MTC data over the shared downlink resource channel further includes using a subframe of the shared downlink resource channel that was reserved for the user device.

4. The method of claim 1, further comprising:
determining, by the base station and after determining the uplink repetition level, a downlink repetition level for coverage extension based on downlink RF conditions and reliability requirements from the profile data.

5. The method of claim 4, wherein the uplink repetition level is different than the downlink repetition level.

6. The method of claim 1, further comprising:
identifying, by the base station, ultra-reliable data requiring downlink transmission to a different device within the cell, wherein the ultra-reliable data has an increased repetition level over other mobile broadband data using the shared downlink resource channel;
inserting, by the base station, the ultra-reliable data without downlink control information (DCI) into another subframe of the shared downlink resource channel previously reserved for another user device; and
sending, by the base station, the ultra-reliable data without DCI over the shared downlink resource channel.

7. The method of claim 1, further comprising:
receiving, by the user device, input signals including the non-MTC data;
detecting, by the user device, a modulation level of the input signals as higher than BPSK; and
discarding, by the user device, the non-MTC data when the modulation level of the input signals is higher than BPS K.

8. The method of claim 7, wherein detecting the modulation level comprises:
performing channel compensation for the input signals;
buffering the input signals as a complete subframe;
logging in-phase and quadrature components of each bit of the complete subframe; and
applying pattern recognition to the logged in-phase and quadrature components to provide a binary indication of BPSK modulation or non-BPSK modulation.

9. The method of claim 7, further comprising:
receiving, by the user device, other input signals including the MTC data;
detecting, by the user device, a modulation level of the other input signals as BPSK; and
decoding, by the user device, the other input signals when the modulation level of the input signals is BPS K.

10. The method of claim 1, wherein the profile data further includes a maximum transmit power level of the user device.

11. A system comprising a base station, the base station including:
a memory to store one or more instructions;
a communication interface to transmit and receive radio frequency (RF) signals; and
a processor to execute the one or more instructions to:
receive, via a physical random access channel, an attach request from a user device,
retrieve, from a core network, profile data for the user device, wherein the profile data includes an indication that the user device transmits low priority machine-type communication (MTC) data,
determine, based on radio frequency (RF) conditions estimated from the attach request, an initial downlink repetition level for extending coverage to the user device,
receive, after receiving the attach request, a reference signal from the user device via a physical uplink shared channel,
determine an uplink repetition level for coverage extension based on uplink RF conditions and requirements from the profile data,
detect a congestion level with a cell or portion of the cell,
identify a shared downlink resource channel for the user device, wherein data for the user device uses binary phase shift keying (BPSK) modulation over the shared downlink resource channel,
identify non-MTC data requiring downlink transmission to another device within the cell, and
send the non-MTC data to the other device over the shared downlink resource channel, and on a subframe pre-allocated for the user device, using a modulation level other than BPSK, wherein the modulation level other than BPSK indicates that the non-MTC data is to be discarded by the user device.

12. The system of claim 11, wherein, when sending the non-MTC data over the shared downlink resource channel, the processor further executes the one or more instructions to use quadrature phase shift keying (QPSK) or a higher level modulation.

13. The system of claim 11, wherein when sending the non-MTC data over the shared downlink resource channel, the processor further executes the one or more instructions to use a subframe of the shared downlink resource channel that was reserved for coverage extension repetition for the user device.

14. The system of claim 11, wherein the processor is further to:
determine, after determining the uplink repetition level, a downlink repetition level for coverage extension based on downlink RF conditions and reliability requirements from the profile data.

15. The system of claim 11, wherein the base station distinguishes between the MTC data for the user device and the non-MTC data for the other device by using BPSK modulation and higher than BPSK modulation.

16. The system of claim 11, further comprising the user device, wherein the user device includes another memory and another processor to:
receive input signals from the base station, the input signals including the non-MTC data;
detect a modulation level of the input signals as higher than BPSK; and
discard the non-MTC data when the modulation level of the input signals is higher than BPSK.

17. The system of claim 11, wherein the processor is further to:
identify ultra-reliable data requiring downlink transmission to a different device within the cell, wherein the ultra-reliable data has an increased repetition level over other mobile broadband data using the shared downlink resource channel;

insert the ultra-reliable data without downlink control information (DCI) into another subframe of the shared downlink resource channel previously reserved for another user device; and send the ultra-reliable data without DCI over the shared downlink resource channel.

18. The system of claim 17, wherein the base station includes an enhanced NodeB.

19. A non-transitory computer-readable medium containing instructions executable by at least one processor, the computer-readable medium comprising one or more instructions to:

receive, via a physical random access channel, an attach request from a user device;

retrieve, from a core network, profile data for the user device, wherein the profile data includes an indication that the user device transmits low priority machine-type communication (MTC) data;

determine, based on radio frequency (RF) conditions estimated from the attach request, an initial downlink repetition level for extending coverage to the user device;

receive, after receiving the attach request, a reference signal from the user device via a physical uplink shared channel;

determine an uplink repetition level for coverage extension based on uplink RF conditions and requirements from the profile data;

detect a congestion level with a cell or portion of the cell;

identify a shared downlink resource channel for the user device, wherein data for the user device uses binary phase shift keying (BPSK) modulation over the shared downlink resource channel;

identify non-MTC data requiring downlink transmission to another device within the cell; and send the non-MTC data to the other device over the shared downlink resource channel, and on a subframe pre-allocated for the user device, using a modulation level other than BPSK, wherein the modulation level other than BPSK indicates that the non-MTC data is to be discarded by the user device.

20. The non-transitory computer-readable medium claim 19, further comprising one or more instructions to:

identify ultra-reliable data requiring downlink transmission to a different device within the cell, wherein the ultra-reliable data has an increased repetition level over other mobile broadband data using the shared downlink resource channel;

insert the ultra-reliable data without downlink control information (DCI) into another subframe of the shared downlink resource channel previously reserved for another user device; and send the ultra-reliable data without DCI over the shared downlink resource channel.

* * * * *